US011885376B2

(12) United States Patent
Fetty

(10) Patent No.: US 11,885,376 B2
(45) Date of Patent: Jan. 30, 2024

(54) ROLLER BEARING SEAL CASE

(71) Applicant: Amsted Rail Company, Inc., Chicago, IL (US)

(72) Inventor: Mark W. K. Fetty, Chesterfield, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 286 days.

(21) Appl. No.: 17/366,567

(22) Filed: Jul. 2, 2021

(65) Prior Publication Data
US 2021/0404518 A1 Dec. 30, 2021

Related U.S. Application Data

(62) Division of application No. 16/537,240, filed on Aug. 9, 2019, now abandoned.

(51) Int. Cl.
*B29C 45/14* (2006.01)
*B23P 15/00* (2006.01)
(Continued)

(52) U.S. Cl.
CPC ............ *F16C 33/78* (2013.01); *B23P 15/003* (2013.01); *B29C 31/00* (2013.01);
(Continued)

(58) Field of Classification Search
CPC ........... Y10T 29/4998; Y10T 29/49982; Y10T 29/49705; B29C 45/14819; B29C 2045/1404; B29D 99/0085; B23P 15/003
See application file for complete search history.

(56) References Cited

U.S. PATENT DOCUMENTS 1,978,739 A 10/1934 Brittain, Jr.
2,736,584 A 2/1956 Riesing
(Continued)

FOREIGN PATENT DOCUMENTS

JP 2005220940 A 8/2005
JP 2015021590 A 2/2015
JP 2001059525 A 3/2021

OTHER PUBLICATIONS

Invitation to Pay Additional Fees from corresponding International Application No. PCT/US2020/043194 dated Sep. 16, 2020; 2 pages.
(Continued)

*Primary Examiner* — Jermie E Cozart
(74) *Attorney, Agent, or Firm* — Fitch, Even, Tabin & Flannery LLP

(57) ABSTRACT

In one aspect, a seal case is provided for a roller bearing assembly having a central axis. The seal case includes an annular first end section including a rim configured to engage an outer ring, an intermediate section including a radial wall extending inwardly from the first end section and an axial wall extending axially away from the radial wall and the first end section, and an annular second end section extending radially inward from the axial wall of the intermediate section. The seal case further includes an insert of the first end section made of a first material. The first end section and the radial wall of the intermediate section include a second material joined to the insert. The first material of the insert may be selected to provide improved durability and/or to resist expansion and contraction of the first end section caused by changes in temperature.

24 Claims, 9 Drawing Sheets

(51) Int. Cl.
  *B29D 99/00* (2010.01)
  *F16C 33/78* (2006.01)
  *F16C 19/38* (2006.01)
  *B29C 70/68* (2006.01)
  *B29C 31/00* (2006.01)
  *B29C 70/70* (2006.01)
  *B29C 70/54* (2006.01)
  *B29K 105/20* (2006.01)
  *B29K 705/00* (2006.01)

(52) U.S. Cl.
  CPC .. *B29C 45/14008* (2013.01); *B29C 45/14065* (2013.01); *B29C 45/14819* (2013.01); *B29C 70/541* (2013.01); *B29C 70/682* (2013.01); *B29C 70/70* (2013.01); *F16C 19/38* (2013.01); *B29C 2045/1404* (2013.01); *B29D 99/0085* (2013.01); *B29K 2105/20* (2013.01); *B29K 2705/00* (2013.01); *F16C 2326/10* (2013.01); *Y10T 29/4998* (2015.01); *Y10T 29/49705* (2015.01); *Y10T 29/49885* (2015.01); *Y10T 29/49982* (2015.01)

(56) References Cited

U.S. PATENT DOCUMENTS

| | | | |
|---|---|---|---|
| 2,834,616 A | 5/1958 | Gebert | |
| 3,396,975 A | 8/1968 | Otto | |
| 3,494,682 A | 2/1970 | Keller | |
| 3,752,543 A | 8/1973 | Schmidt | |
| 4,458,957 A | 7/1984 | Greener | |
| 4,541,744 A | 9/1985 | Ledeman | |
| 4,743,034 A * | 5/1988 | Kakabaker | F16J 15/4474 384/480 |
| 4,789,166 A | 12/1988 | Rericha | |
| 5,087,057 A | 2/1992 | Kurkowski | |
| 5,186,548 A | 2/1993 | Sink | |
| 5,380,102 A | 1/1995 | Sink | |
| 5,431,872 A | 7/1995 | Sink | |
| 5,511,886 A | 4/1996 | Sink | |
| 5,549,395 A | 8/1996 | Sink | |
| 5,577,741 A | 11/1996 | Sink | |
| 5,588,752 A | 12/1996 | Fetty | |
| 5,597,356 A | 1/1997 | Rieder | |
| 5,860,748 A | 1/1999 | Okumura | |
| 5,975,533 A | 11/1999 | Hubbard | |
| 6,126,321 A | 10/2000 | Fetty | |
| 6,322,082 B1 | 11/2001 | Paykin | |
| 6,386,546 B1 | 5/2002 | Fedorovich | |
| 6,471,211 B1 | 10/2002 | Garnett | |
| 7,534,047 B2 | 5/2009 | Reed | |
| 7,546,807 B2 | 6/2009 | Johnstone | |
| 7,549,379 B2 | 6/2009 | Monaco | |
| 7,607,836 B2 | 10/2009 | Mason | |
| 7,955,001 B2 | 6/2011 | Reed | |
| 8,109,674 B2 | 2/2012 | Hubbard | |
| 8,226,299 B2 | 7/2012 | Hubbard | |
| 8,356,941 B2 | 1/2013 | Mason | |
| 8,356,945 B2 | 1/2013 | Mason | |
| 8,360,651 B1 | 1/2013 | Fetty | |
| 8,533,957 B2 | 9/2013 | Spurlock | |
| 8,556,270 B2 | 10/2013 | Toth | |
| 8,596,872 B2 | 12/2013 | Pruden | |
| 8,696,212 B2 | 4/2014 | Hubbard | |
| 8,708,571 B2 | 4/2014 | Kurohara | |
| 8,790,014 B2 | 7/2014 | Shimizu | |
| 9,150,226 B2 | 10/2015 | Rode | |
| 9,285,034 B2 | 3/2016 | Balsells | |
| 9,689,431 B2 | 6/2017 | Walter | |
| 9,982,719 B2 | 5/2018 | Harada | |
| 10,093,069 B2 | 10/2018 | Liu | |
| 10,330,156 B2 | 6/2019 | Hubbard | |
| 10,371,210 B2 | 8/2019 | Hargraves | |
| 10,711,842 B2 | 7/2020 | Liebe | |
| 2003/0201609 A1 | 10/2003 | Hood | |
| 2007/0222161 A1 | 9/2007 | Voydatch | |
| 2007/0242913 A1 | 10/2007 | Kawaguchi | |
| 2008/0031561 A1 | 2/2008 | Hakata | |
| 2008/0135664 A1 * | 6/2008 | Hiraguchi | G11B 23/107 242/899 |
| 2008/0226212 A1 | 9/2008 | Mason | |
| 2009/0127795 A1 | 5/2009 | Lattime | |
| 2011/0216993 A1 | 9/2011 | Mason | |
| 2012/0257849 A1 | 10/2012 | Corbett | |
| 2012/0317814 A1 | 12/2012 | Spurlock | |
| 2014/0159318 A1 | 6/2014 | Lattime | |
| 2014/0225333 A1 | 8/2014 | Siegel | |
| 2014/0333031 A1 | 11/2014 | Tones | |
| 2016/0223086 A1 | 8/2016 | Balsells | |
| 2017/0335890 A1 | 11/2017 | Harada | |
| 2021/0040991 A1 | 2/2021 | Fetty | |

OTHER PUBLICATIONS

Machine Translation of JP2001059525A; 3 pages.
Machine Translation of JP2015021590A; 7 pages.
PCT Search Report and Written Opinion from corresponding International Application No. PCT/US2020/043194 dated Nov. 17, 2020; 11 pages.

* cited by examiner

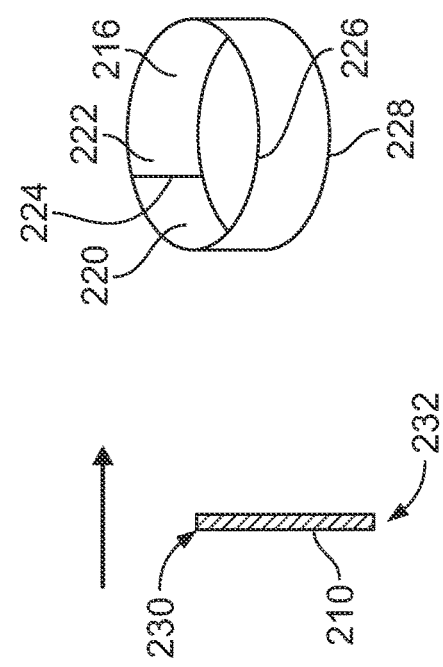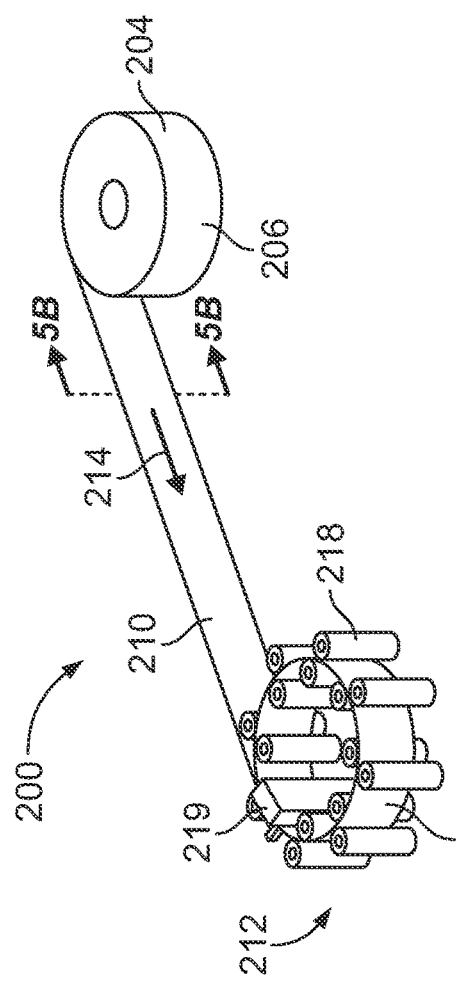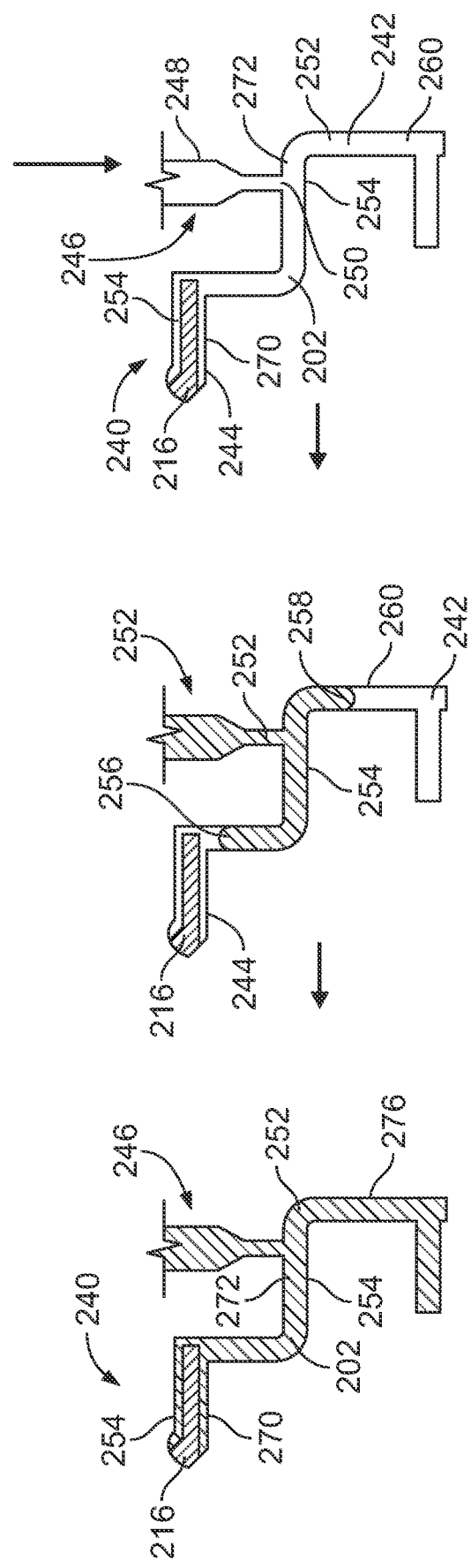

ROLLER BEARING SEAL CASE

CROSS-REFERENCE TO RELATED APPLICATION

This application is a divisional of U.S. patent application Ser. No. 16/537,240, filed Aug. 9, 2019, which is hereby incorporated herein by reference in its entirety.

FIELD

This disclosure relates to roller bearing assemblies and, more specifically, to a seal case for a roller bearing assembly.

BACKGROUND

Roller bearing assemblies are often used to rotatably connect a shaft of a railcar wheel set to a frame of a railcar bogie. Roller bearing assemblies are known that include tapered roller bearings preassembled into a self-contained, pre-lubricated cartridge-type package for assembly onto a journal of a shaft. Roller bearing assemblies typically include an outer ring with two inward facing tapered raceways, commonly referred to as a "double cup" or just "a cup," two inner rings with opposing outward facing tapered raceways, commonly called cones, and two rows of multiple tapered rollers, each set distributed angularly between the cup and cone raceways. Each row of rollers are separated, guided, and held onto its respective cone by a cage, thus forming an inner ring assembly called a cone assembly. The opposing cone assemblies are fitted one into each end of the bearing cup, with the bearing cones having an inner diameter dimensioned to provide an interference fit with the shaft journal.

Seals are mounted at each end of the bearing cup to resist egress of lubricant and resist ingress of debris and water. The seals for these types of roller bearing assemblies include a seal case that is an annular, shroud-like structure having a first end that is securely mounted to the predominantly stationary bearing cup such that it does not rotate, and a second end positioned near an associated wear ring. The second end of the seal case may include a resilient seal element that contacts the wear ring as the wear ring rotates with rotation of the journal. In other approaches, the seal utilizes a tortuous path to inhibit the egress of lubricant and the ingress of debris and water. The tortuous path may be defined between the seal case and a rotor mounted to the wear ring or between a seal case and a rotating ring that incorporate features that create a tortuous path.

A seal case is typically made from stamped steel. The steel is strong enough to be durable for the lifetime of the bearing assembly. Molded polymer seal cases have also been employed that are lighter than stamped steel seal cases. However, it has been discovered that these polymer seal cases are often too flimsy to provide the durability required by the bearing assembly. Further, the polymer material of the seal case expands and contracts by in response to temperature changes differently than the metallic material of the bearing cup and wear ring, which are typically made of steel. The difference in expansion and contraction of the polymer material of the polymer seal case and the steel of the bearing cup may cause changes in the geometry of the polymer seal case that adversely affect the connection between the seal case and the bearing cup. For example, in some situations at very low ambient temperatures, the polymer material of the polymer seal case may shrink enough to cause the polymer seal case to spin within the bearing cup, or even disengage from the bearing cup.

Another issue caused by differences in temperature-driven expansion and contraction of prior polymer seal cases and bearing cups relates to the labyrinth seals of the roller bearing assembly. More specifically, each labyrinth seal may be defined between a portion of the seal case, such as a labyrinth stator, and a rotor mounted to one of the wear rings of the roller bearing assembly. As the polymer seal case expands or contracts due to changes in temperature, the labyrinth stator may change position relative to the rotor which changes the geometry of the tortuous path formed between the labyrinth stator and the rotor. Changes to the geometry of the tortuous path may adversely affect the ability of the labyrinth seal to resist egress of lubricant and ingress of water and debris.

One prior approach to providing a seal case utilizes a steel seal case body and a polymer labyrinth stator that is mechanically joined to the steel seal case body. The steel seal case body provides durability and temperature-driven expansion/contraction similar to the associated bearing cup and wear ring that are also made of steel. However, the operation of mechanically joining the steel seal case body and the polymer labyrinth stator complicates assembly and requires close manufacturing tolerances in order to achieve the secure connection between the components.

SUMMARY

In accordance with one aspect of the present disclosure, a seal case is provided for a roller bearing assembly having a central axis. The seal case includes an annular first end section including a rim configured to engage a bearing outer ring, an intermediate section including a radial wall extending inwardly from the first end section and an axial wall extending axially away from the radial wall and the first end section, and an annular second end section extending radially inward from the axial wall of the intermediate section. The first end section includes an insert made of a first material. Further, the first end section and the radial wall of the intermediate section include a second material joined to the insert. The first material of the insert may be selected to provide improved durability for the first end section of the seal case. The first material of the insert may also be selected to provide temperature-driven expansion and contraction of the first end section of the seal case that is similar to the material of the associated bearing outer ring to provide a more geometrically stable interface between the seal case and the bearing outer ring throughout the operating temperature range of the roller bearing assembly.

In one embodiment, the first material of the insert is a metallic material such as steel and the second material of the first end section and the radial wall of the intermediate section is a polymer. The steel insert expands and contracts less with temperature changes than does the polymer. The steel insert thereby maintains the geometry of the first end section and keeps the seal case engaged with the bearing outer ring. Further, the polymer material of the first end section and the intermediate section radial wall reduces the weight of the seal case.

The present disclosure also provides a railway bearing including an outer ring having an outer raceway, an inner ring having an inner raceway, and a plurality of bearings received between the inner and outer raceways. In one embodiment, the bearings include tapered roller bearings. The railway bearing includes a wear ring configured to rotate with the inner ring relative to the outer ring. The railway bearing further includes a seal case having a first end section engaged with the outer ring, an insert of the first end section including a first material, a second end section radially inward from the first end section and adjacent the wear ring, and an intermediate section connecting the first end section and the second end section. Further, the first end section includes a second material joined to the insert. In this manner, the insert provides the first end section of the seal case with improved durability and temperature-driven expansion and contraction characteristics than could be provided by the second material alone.

In accordance with another aspect of the present disclosure, a method is provided for making a roller bearing assembly seal case having a central axis. The method includes positioning an insert of a first material in a first portion of a mold configured to form an annular, axially extending first end section of a seal case for a roller bearing assembly. The mold has a second portion configured to form an annular second end section of the seal case. The method includes advancing a second material into the mold to form an intermediate section of the seal case and joining the second material to the insert. By joining the second material to the insert in the mold, the connection between the first and second materials is formed in conjunction with forming the shape of the seal case which makes manufacture of the seal case more straightforward. Further, joining the second material to the insert in the mold and forming the shape of the seal case using the mold avoids having to assemble two components by automated or manual approaches and the associated tolerance issues that arise from assembling of components.

BRIEF DESCRIPTION OF THE DRAWINGS

FIGS. 5A, 5B, 5C, 5D, 5E, and 5F show an example method of manufacturing a seal case;

DETAILED DESCRIPTION

Figure 1:
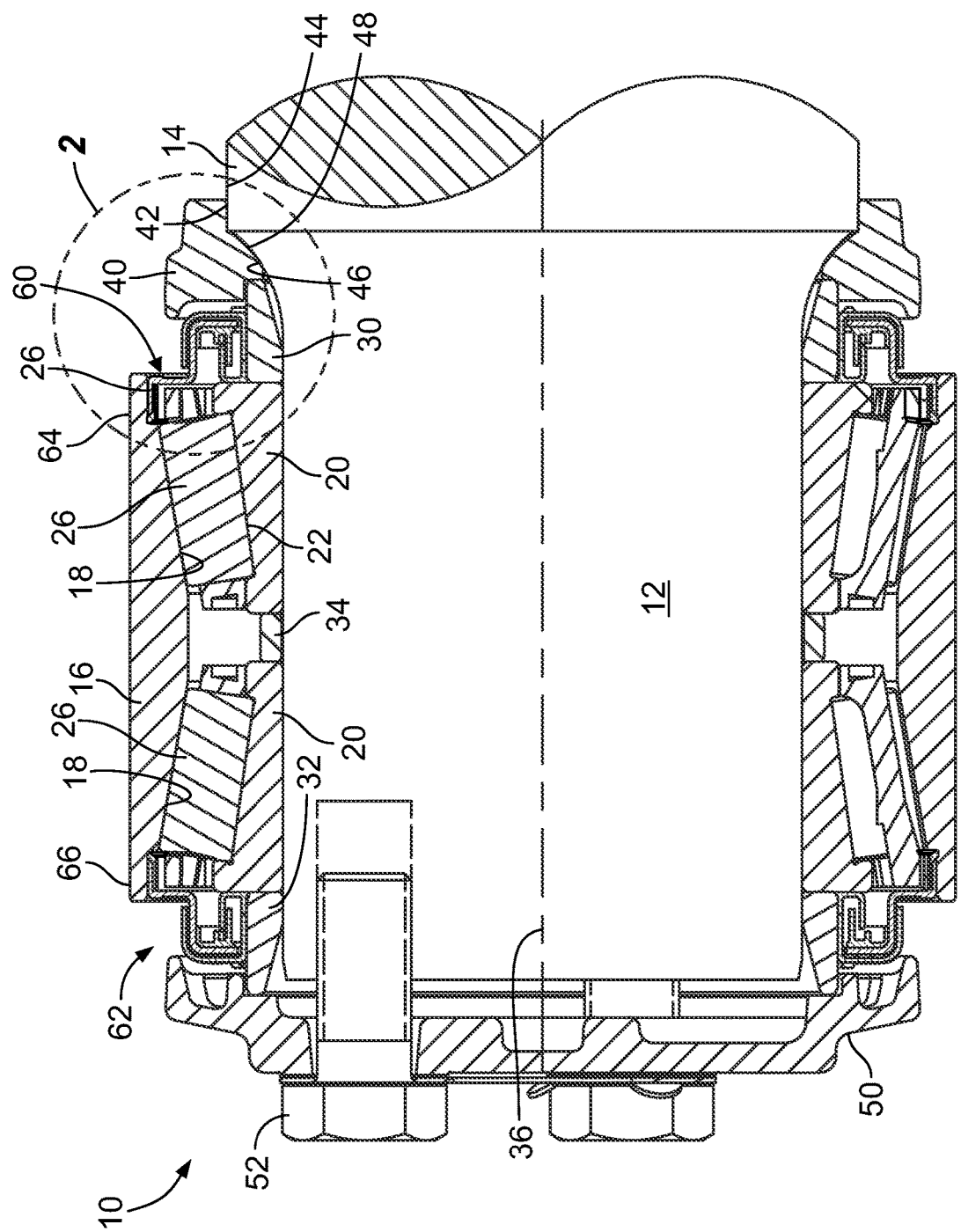
FIG. 1 is a cross-sectional view of a bearing assembly showing seal cases of the bearing assembly mounted to opposite ends of a bearing cup of the bearing assembly.

With reference to FIG. 1, a bearing assembly 10 is provided for mounting to a journal 12 of a shaft 14 of a railcar. The bearing assembly 10 includes an outer ring, such as a bearing cup 16, having one or more outer, inwardly directed raceways 18 and one or more inner rings, such as cones 20, having an inner diameter sized to be press-fit onto the journal 12. The cones 20 each include an inner, outwardly directed raceway 22 that is aligned with the inwardly directed raceway 18 of the bearing cup 16. The bearing assembly 10 includes bearings, such as tapered roller bearings 26, that travel between the inwardly directed raceway 18 and the outwardly directed raceway 22 as the journal 12 and cones 20 mounted thereon rotate. The bearing assembly 10 further includes wear rings 30, 32 and a spacer 34 that separates the cones 20 along a central axis 36 of rotation of the journal 12. To position the bearing assembly 10 axially along the journal 12, the bearing assembly 10 includes a backing ring 40 having a cylindrical counterbore 42 that receives a cylindrical shoulder 44 of the shaft 14 and a contoured surface 46 that matches a fillet 48 of the shaft 14. The bearing assembly 10 includes a bearing retaining cap 50 secured to the journal 12 by fasteners, such as bolts 52.

The bearing assembly 10 includes a lubricant in the region between the bearing cup 16 and the cones 20 and spacer 34. The bearing assembly 10 has seals 60, 62 at an inboard end 64 and an outboard end 66 of the bearing cup 16. The seals 60, 62 are mirror images of each other such that seal 60 will be discussed in greater detail.

Figure 2:
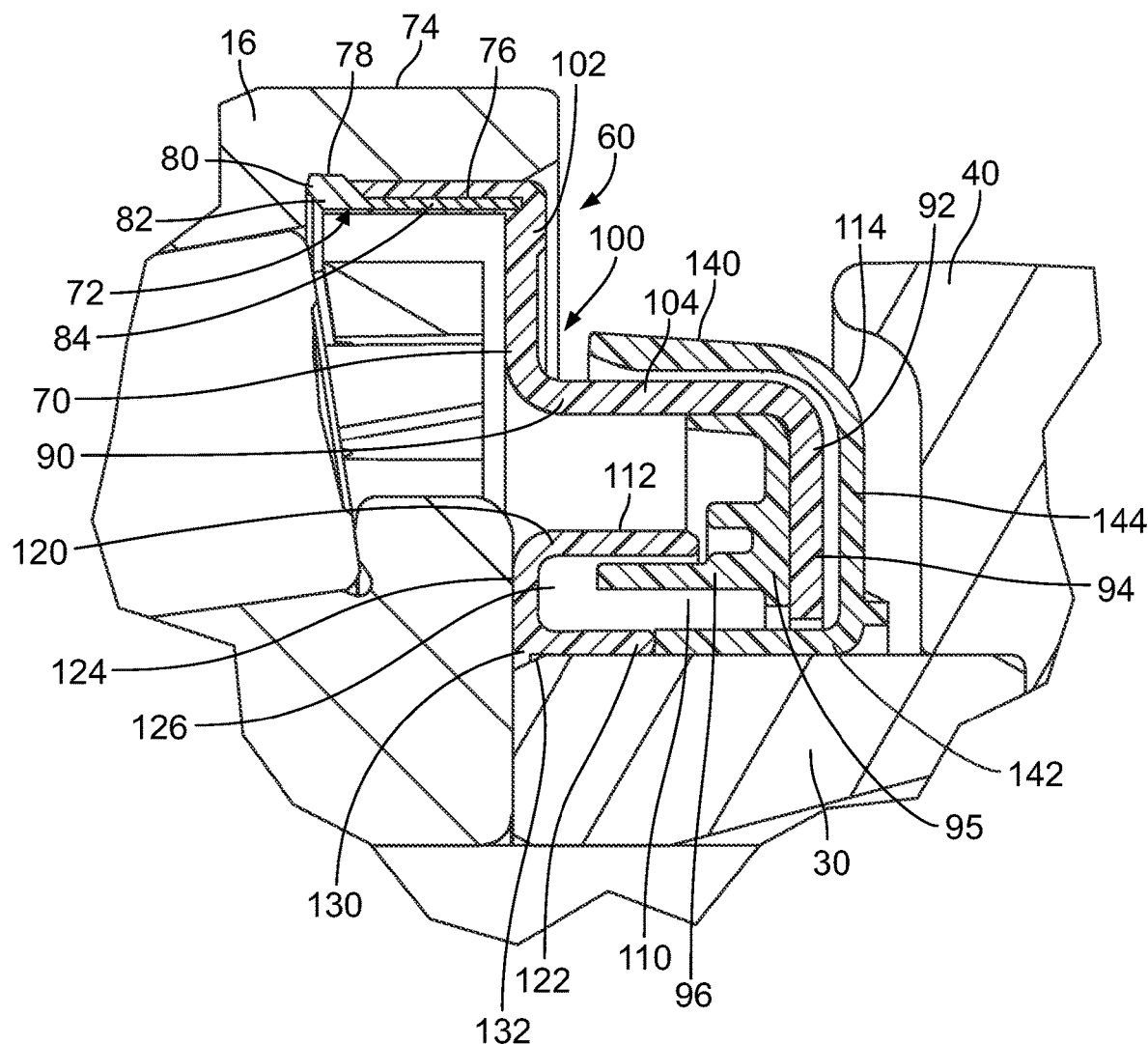
FIG. 2 is an enlarged portion of FIG. 1 showing one of the seal cases, the one seal case having a first end section of the seal case having an insert and a second end section of the seal case adjacent a wear ring of the bearing assembly.

With reference to FIG. 2, the seal 60 includes a seal case 70 having a first end section 72 engaged with an axial wall 74 of the bearing cup 16. The first end section 72 includes an insert 76 made of a first material, such as a metallic material, that provides rigidity for the seal case 70 at the interface between the seal case 70 and the bearing cup 16. The axial wall 74 of the bearing cup 16 includes a recessed groove 78 and the first end section 72 includes a protrusion, such as a rib 80, that engages the groove 78. The rib 80 may be continuous or include a plurality of circumferentially spaced ribs 80. The insert 76 includes a mounting portion 82 at the rib 80 and a support portion 84 extending away from the mounting portion 82. In one embodiment, the insert 76 forms part of or all of the rib 80. The seal case 70 includes a body 90 made of a second material, such as a polymer material, that is joined to the insert 76. In one embodiment, the insert 76 and the body 90 are joined by over-molding the insert 76 with the body 90.

The insert 76 and body 90 may be made from a variety of materials. For example, the insert 76 may be made of one or more metals such as aluminum and/or steel. The body 90 may be made from one or more structural plastics, such as a rigid plastic polymer resin.

The bearing cup 16, cone 20, and wear ring 30 are made of a metallic material, such as steel, and expand and contract with changes in temperature according to the properties of the metallic materials. The insert 76, also made of a metallic material, expands and contracts in a manner similar to the bearing cup 16, cones 20, and wear rings 30, 32. The similar behavior of the insert 76 keeps the seal case 70 securely engaged with the bearing cup 16 throughout the operating temperature range of the bearing assembly 10. Further, the seal case 70 provides an improvement over some prior all-plastic seal cases that would expand and contract at different rates than the adjacent bearing cup and could disengage from the bearing cup, such as upon the seal case contracting more than the bearing cup 16 in response to very low temperatures. Further, the material of the insert 76 may be selected to be stronger than the second material of the body 90 so that the insert 76 strengthens the seal case 70 and improves the durability of the seal case 70.

The seal case 70 includes a second end section 92 having a radial wall 94 near the wear ring 30. In one embodiment, the second end section 92 includes a labyrinth stator 95 joined to the radial wall 94, such as being press-fit into the body 90. The labyrinth stator 95 includes one or more axial walls 96 extending away from the radial wall 94. The labyrinth stator 95 may be made of an engineered plastic polymer or thermoplastic such as polyester or composite material The seal case 70 includes an intermediate portion 100 connecting the first end section 72 and the second end section 92. The intermediate portion 100 includes a radial wall 102 extending radially inward from the first end section 72 and an axial wall 104 extending along the central axis 36 from the radial wall 102. The radial and axial walls 102, 104 form a step-like profile of the seal case 70. As used herein, the term radial refers to a structure extending primarily radially inward or radially outward and not necessarily being perpendicular to the axis 36. Likewise, the term axial is used to describe a component that extends primarily along the axis 36 but does not require that the component extend parallel to the axis 36.

The seal 60 as shown in FIG. 2 is a contactless seal that utilizes a tortuous path 110 to inhibit the egress of lubricant and the ingress of water and debris. The tortuous pathway 110 is defined at least in part by the stator 95 that is held in place by the seal case 70, the rotor 112 mounted to the wear ring 30 and optionally a slinger 114 also mounted to the wear ring 30. The tortuous pathway 110 is also defined by the adjacent outer surfaces of the seal case 70, such as those of the outer radial wall 94 and the axial wall 104. When the journal 12 rotates, the wear ring 30, the rotor 112, and the slinger 114 rotate together relative to the predominantly stationary seal case 70 and labyrinth insert 95.

The rotor 112 has an outer section 120, an inner section 122, and an intermediate section 124. The outer section 120, the intermediate section 124, and the inner section 122 define an annular channel 126 that receives the axial wall 96 of the labyrinth stator 95. The inner section 122 may have an inner diameter sized to form a press-fit engagement with the wear ring 30 and/or the slinger 114. The rotor 112 may also include a bead or rib 130 that engages a chamfer 132 of the wear ring 30 and resists axial movement of the rotor 112.

Figure 4:
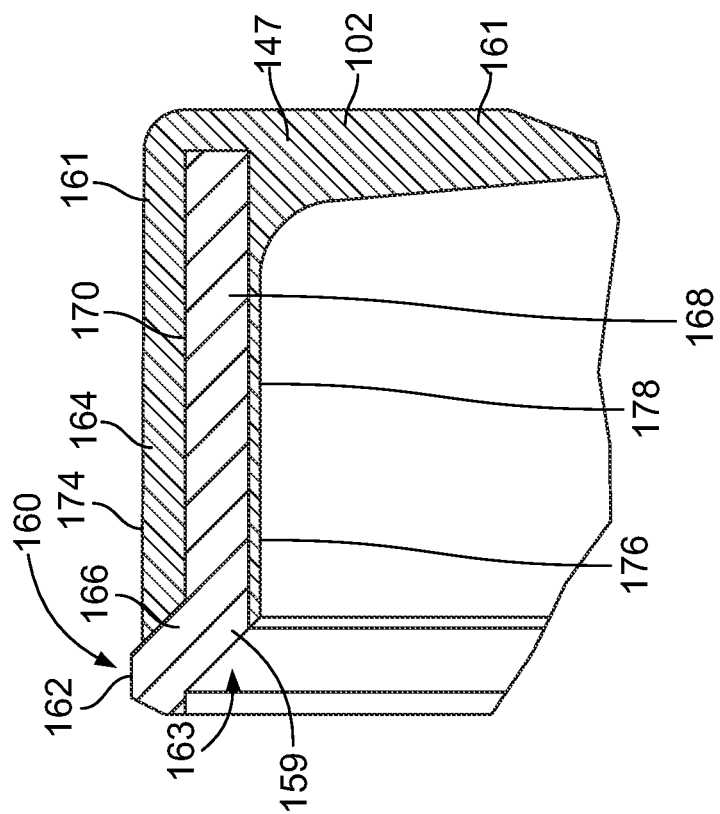
FIG. 4 is an enlarged portion of FIG. 3 showing the insert having a bead extending radially outward for engaging a groove of a bearing cup and retaining the seal case in the bearing cup.

Regarding FIG. 4, the slinger 114 includes a first end section 140, a second end section 142, and an intermediate section 144. The second end section of the slinger 114 has an inner diameter sized to form an interference fit with the wear ring 30. The interference fits between the rotor 112 and the wear ring 30 and between the slinger 114 and the wear ring 30 provide a secure connection therebetween. In some embodiments, the rotor 112 and the slinger 114 are made from the same or different materials. For example, the rotor 112 and the slinger 114 may be made of one or more metals, such as steel, and one or more polymers. Example polymers include an engineered plastic polymer and thermoplastics such as polyester or composite material. Further, the rotor 112 and the slinger 114 may each have a unitary, one-piece construction.

Figure 3:
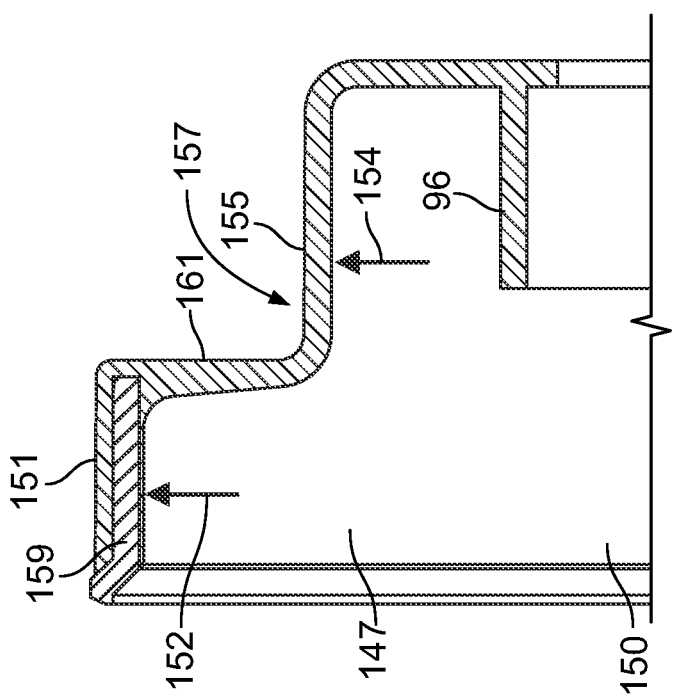
FIG. 3 is a cross-sectional view of a seal case having a first end section with an insert and a second end section with an axially extending wall that forms a portion of a tortuous pathway.

With reference to FIG. 3, a seal case 147 is provided that is similar in many respects to the seal case 70. The seal case 147 has a through opening 150 for receiving the journal 12 and wear ring 30 therethrough. The seal case 147 has a first end section 151 with an inner diameter 152 that is larger than an inner diameter 154 of an axial wall 155 of an intermediate portion 157 of the seal case 147. The seal case 147 includes an insert 159 made of a first material and a body 161 made of a second material. The insert 159 is partially embedded in the second material of the body 161. Because the insert 159 is partially embedded in the second material of the body 161, the seal case 147 has a one-piece construction that permits straightforward assembly of the insert 159 into a bearing cup such as bearing cup 16.

With reference to FIG. 4, the insert 159 includes a mounting portion 163 at a rim 160 of the seal case 147. In one embodiment, the mounting portion 163 includes a projection 162 that extends outward from an outer portion 164 of the second material of the body 161 at the first end section 151. The projection 162 may be, for example, a single continuous bead or a plurality of circumferentially spaced beads. The insert 159 includes a tapered or frustoconical portion 166 extending radially inward from the projection 162. The insert 159 includes a tubular mounting portion 168 extending axially from the frustoconical portion 166. The second material of the body 161 forms a pocket 170 in which the insert 159 is received. The second material of the body 161 includes the outer portion 164 having radially outer surface 174 and an inner portion 176 having an inner surface 178. This sandwiching of the tubular mounting portion 168 of the insert 159 between the inner and outer portions 176, 164 of the second material of the body 161 provides an extended surface area for the second material to bond to the insert 159. This provides a durable connection between the insert 159 and the second material body 161.

With reference to FIGS. 5A-5F, a method 200 is provided for manufacturing a seal case 202. Initially, a coil 204 of a first material 206 is provided. In one embodiment, the first material 206 is a metallic material such as steel. The first material 206 is fed off of the coil 204 as a strip 210 into a ring rolling machine 212. When the strip 210 is fed off of the coil 204, the strip 210 has a flat cross section as shown in FIG. 5B.

The strip 210 is advanced in direction 214 into the ring rolling machine 212 and bent into a ring 216 using rollers 218. Once the ring 216 has made a full circle, the ring rolling machine 212 has a station that joins ends 220, 222 of the ring 216 together, such as a welding and cutting fixture 219 that welds the ends 220, 222 together. The welding and cutting fixture 219 cuts the ring 216 from the strip 210 and the ring 216 may be removed from the ring rolling machine 212. In one embodiment, the ends 220, 222 are abutting. In another embodiment, the ends 220, 222 are overlapping.

When the ring 216 has been removed from the ring rolling machine 212, the ring 216 has ends 220, 222 connected together such as by the weld 224, fasteners such as rivets, or interlocking features of the ends 220, 222 as some examples. The ring 216 has pairs of annular edges 226, 228 axially spaced from one another. Comparing FIGS. 5A and 5C, the ring rolling machine 212 bends the strip 210 before or after rolling and joining, so that edges of the strip 210 are reconfigured from straight to annular.

With reference to FIG. 5D, the completed ring 216 is positioned in a mold 240 having a mold cavity 242. The mold 240 has two or more sections that are brought together to define the mold cavity 242 for formation of the seal case 202 and are separated to permit removal of the seal case 202 from the mold cavity 242.

The ring 216 is positioned in a mold first portion 244. The mold 240 includes an injector 246 that may include a heated barrel 248 that receives granules of a second material 252, such as plastic granules. The injector 246 may include a drive auger to push the heated material through a port 250 and into the mold cavity 242.

Regarding FIG. 5E, the method 200 includes advancing the second material 252 into the mold cavity 242. In one approach, the second material 252 is injected first into a mold third portion 254. The second material 252 has leading end portions 256, 258 that travel into a mold second portion 260 and the mold first portion 244. In other approaches, the second material 252 may be injected into the mold first portion 244 of the mold second portion 260.

The second material 252 is advanced into the mold first portion 254 and bonds with the ring 216. The mold first portion 254 forms a first end section 270 of the seal case 202. The mold third portion 254 forms an intermediate section 272 of the seal case 202. The mold second portion 260 forms a second end section 276 of the seal case 202.

Once the second material 252 has hardened, the mold 240 may be opened and the seal case 202 may be removed from the mold cavity 242. In this manner, the seal case 202 may be formed using a rigid first material of the ring 216, which can be selected to have similar thermal expansion and contraction behavior as the metal of a bearing cup, and the seal case 202 may further be formed using the second material 252, such as a polymer, which is lighter. The seal case 202 may thereby provide a secure connection to the bearing cup throughout the operating temperature range of the associated railcar while reducing the overall weight of the bearing assembly.

Figure 6:
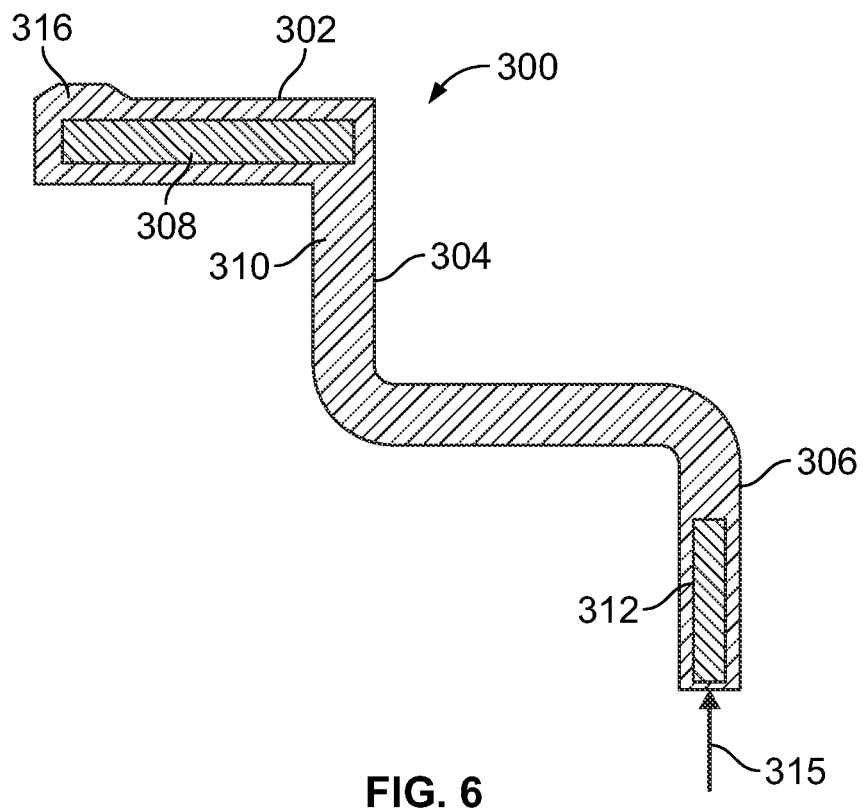
FIG. 6 is a cross-sectional view of a seal case including a first end section having a first insert and a second end section having a second insert.

With reference to FIG. 6, a seal case 300 is provided that is similar in many respects to the seal cases 70, 147, 202 discussed above such that differences will be highlighted. The seal case 300 includes a first end section 302, an intermediate section 304, and a second end section 306. The seal case 300 includes a first insert 308 of a first material, such as a metallic material, and a body 310 of a second material, such as a polymer material, joined to the insert 308. In this embodiment, the body 310 of the seal case 300 forms a radial projection 316 for engaging the groove 78 in the axial wall 74 of the bearing cup 16. The seal case 300 further includes a second insert 312 that may be made of the same material as the first insert 308 or a different material.

The second insert 312 may be made of a metallic or other material that expands and contracts differently than the second material of the body 310 to maintain a geometry of an associated labyrinth seal. For example, the second insert 312 may be made of steel and a labyrinth stator like the labyrinth stator 95 may be press-fit into the seal case 300. The labyrinth stator forms a labyrinth seal with cooperating portions of a rotor. The second end section 306 may be spaced a predetermined distance radially outward from a wear ring to define an inner diameter 315 of the seal case 300. The steel of the second insert 312 may expand or contract less than the second material of the body 310 with changes in temperature such that the labyrinth stator connected to the second end section 306 moves radially inward or outward smaller distances, if at all, with changes in temperature. In this manner, the geometry of the labyrinth seal is preserved despite changes in temperature.

Figure 7:
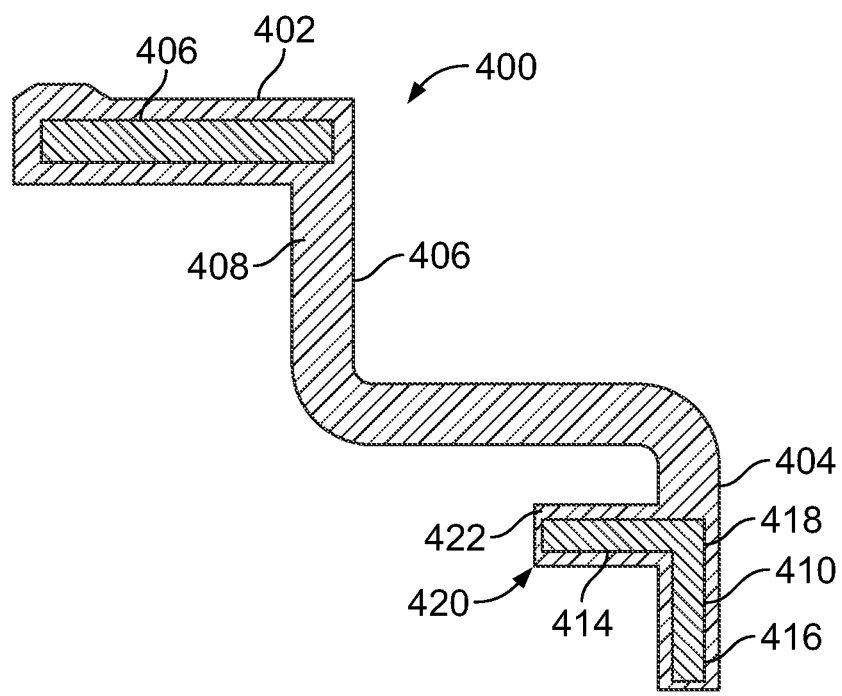
FIG. 7 is a cross-sectional view of a seal case having first and second inserts and the second insert including an axial portion and a radial portion.

With reference to FIG. 7, a seal case 400 is provided that is similar in many respects to the seal case 300. The seal case 400 includes a first end section 402, a second end section 404, and an intermediate section 406. The seal case 400 includes a first insert 406 of a first material and a body 408 of a second material joined to the first insert 406. The seal case 400 includes a second insert 410 of the second end section 404. The second insert 410 may be the same material as the first insert 406 or a different material. The second insert 410 includes an axial portion 414, a radial portion 416, and a bend 418 connecting the portions 414, 416. The axial portion 414 and the radial portion 416 of the second insert 410 strengthen the second end section 404 against changes in geometry of the associated labyrinth seal due to changes in temperature. Further, the second end section 404 has an axial projection 420 that includes a body portion 422 and the axial portion 414 of the second insert 410. The axial projection 420 is configured to define a part of a labyrinth such that a separate labyrinth insert like the insert 95 is not utilized. The L-shaped cross-section of the second insert 410 provides rigidity to the axial projection 420 and resists changes to the geometry o the axial projection 420 which helps maintain the geometry of the labyrinth.

With reference to FIG. 8, a method 500 is provided for forming an insert 502 having a radial portion and an axial portion. With reference to FIG. 8A, a tubular ring 504 is provided such as by using the method 200 discussed above. The ring 504 includes ends 506, 508 secured together at a connection 510. The ring 504 is punched to form openings 512 separating tabs 514 of the ring 504. The openings 512 include a tab portion 516 and an enlarged portion, such as a circular portion 518. The ring 504 includes an annular base portion 520 connecting the tabs 514. The tabs 514 include edges 522 that are separated by edges 522 of nearby tabs 514 by distance 524 across the openings 512.

Next, the ring 514 is partially flattened, such as by compressing the ring 504 in a press, which causes the tabs 514 to splay apart and increases the distance 524 between the edges 522 to a distance 530. The flattening procedure involves bending the tabs 514 until the tabs 504 extend transverse, such as perpendicular, to the initial position of the tabs 514. The circular portions 518 of the openings 512 reduce the width of the tabs 514 at the bases of the tabs 514 near the annular base portion 520. The reduced width of the tabs 514 near the annular base portion 520 focuses deformation of the tabs 514 at bends 541 and makes the tabs 514 easier to bend. The circular portions 518 of the openings 512 also reduce the stress at the bases of the tabs 514 which limits cracking or tearing of the material of the ring 514 during bending. In another embodiment, the insert 502 has a continuous, annular flange extending radially outwardly from the tubular portion instead of openings 512 and tabs 514.

Figure 8C:
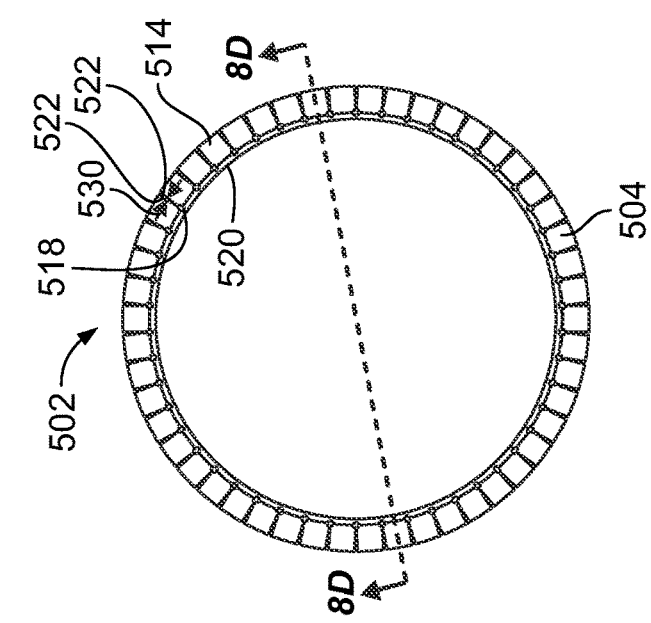
FIGS. 8A, 8B, and 8C show an example method of forming an insert for a seal case.
Figure 8B:
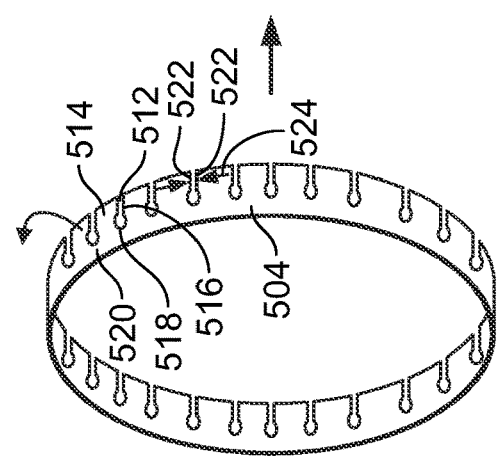
Figure 8A:
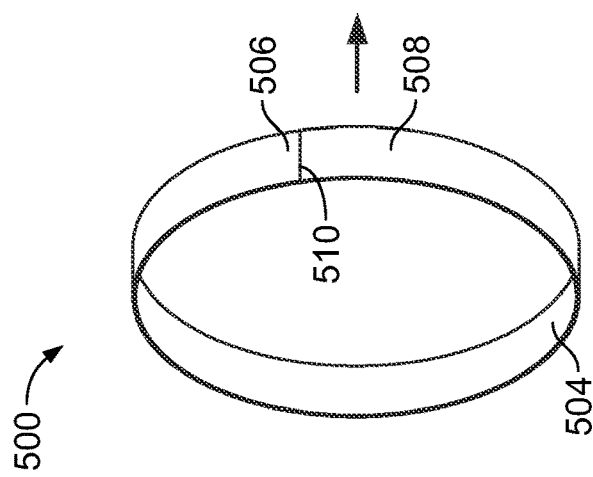
Figure 8D:
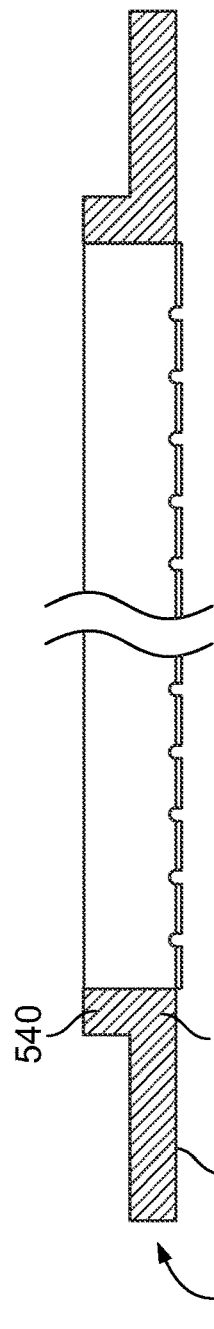
FIG. 8D is a cross-sectional view of the insert taken across line 8D-8D in FIG. 8C.

With reference to FIG. 8D, the partially flattened ring 514 has a cylindrical tubular portion 540 extending axially and the tabs 514 extending radially outward from the cylindrical tubular portion 540. In this manner, an insert having both axial and radial portions may be provided for a seal case.

Figure 9:
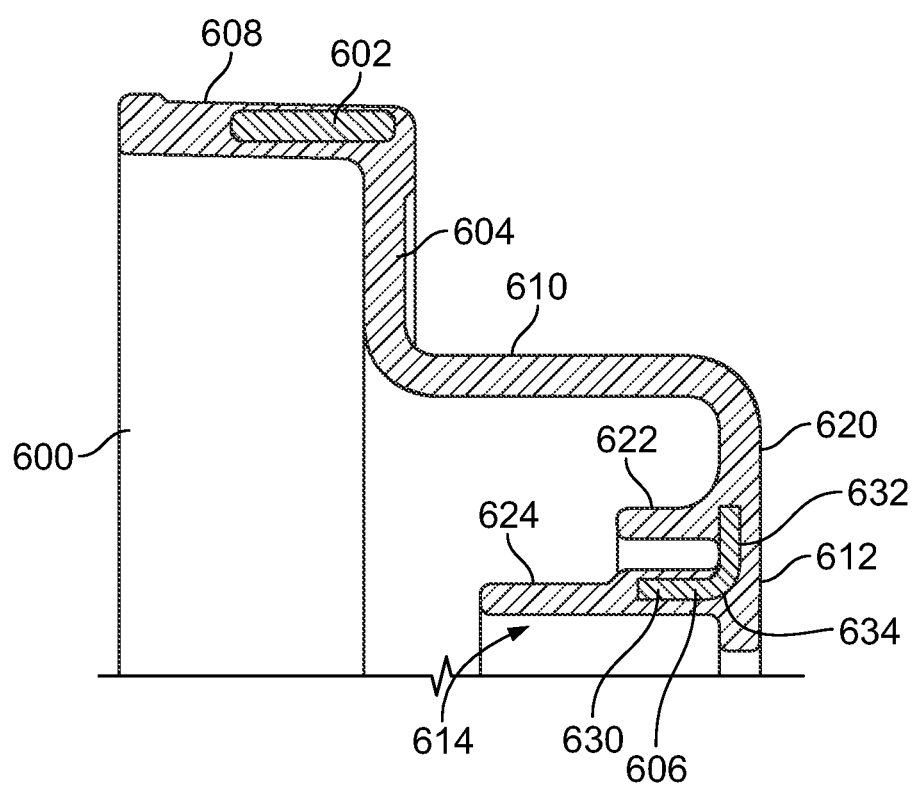
FIG. 9 is a cross-sectional view of a seal case including a first end section having an outer insert and a second end section having an inner insert with flared tabs.

With reference to FIG. 9, a seal case 600 is provided that includes an outer insert 602 made of a first material, a body 604 made of a second material, and an inner insert 606 made of the same or a different material than the outer insert 602. The seal case 600 includes a first end section 608, an intermediate section 610, and a second end section 612. Instead of a separate labyrinth stator, as in the seal case 70 of FIG. 2, the seal case 600 includes an integral labyrinth portion 614 configured to form a labyrinth seal with a rotor, such as the rotor 120 discussed above. The second end section 612 includes a radial wall 620 and the integral labyrinth portion 614 includes an outer grip wall 622 extending axially from the radial wall 620 and an inner labyrinth wall 624 extending axially from the radial wall 620. The outer grip wall 622 may hold the associated rotor during shipping prior to installation. During installation, the rotor is dislodged from the outer grip wall 622 so the rotor can rotate.

Figure 11:
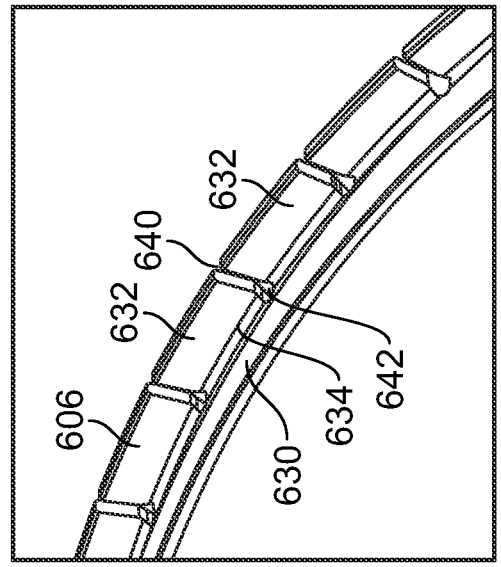
FIG. 11 is an enlarged view of the dashed area in FIG. 10 showing tabs of the insert separated by gaps.
Figure 10:
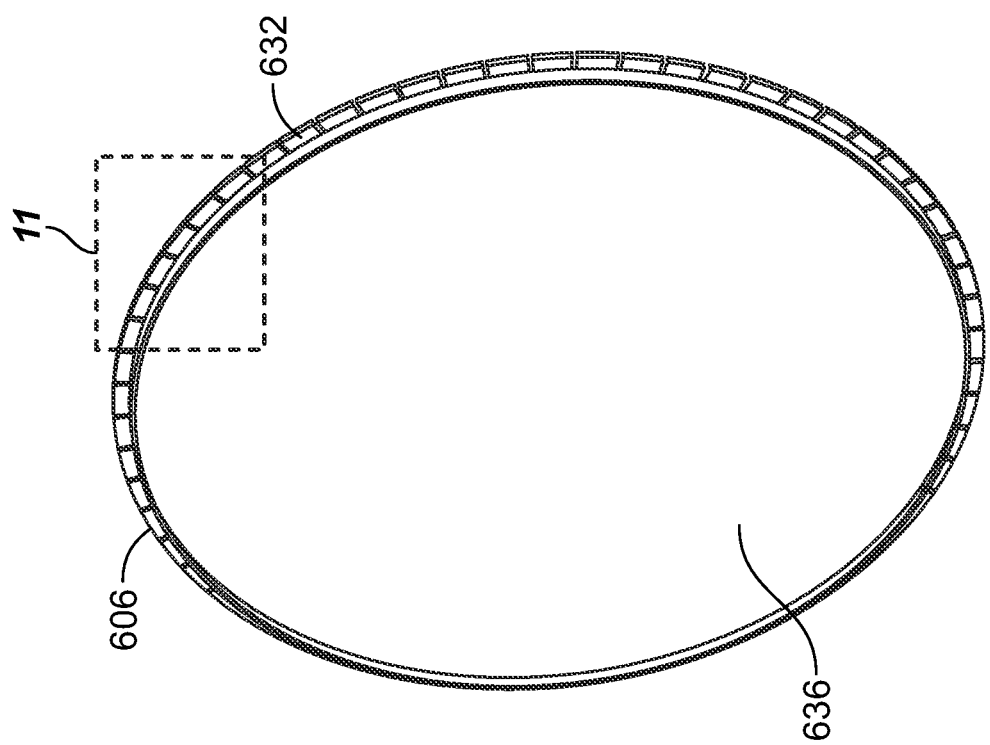
FIG. 10 is a perspective view of the inner insert of FIG. 9 showing a central opening of the inner insert.

The inner insert 606 is similar in many respects to the insert 502 discussed above and may be manufactured in a similar manner. The inner insert 606 includes an annular base portion 630, a plurality of flared tabs 632, and a corner or bend 634 for connecting the tabs 632 to the annular base portion 630. With reference to FIGS. 10 and 11, the inner insert 606 has a central opening 636 and the tabs 632 are separated by radially extending gaps 640. The inner insert 606 further includes enlarged portions 642 of the gaps 640 that narrow the tabs 632 at the bend 634 which focuses deformation of the tabs 632 at the bends 634 and makes the tabs 632 easier to bend.

Figure 12:
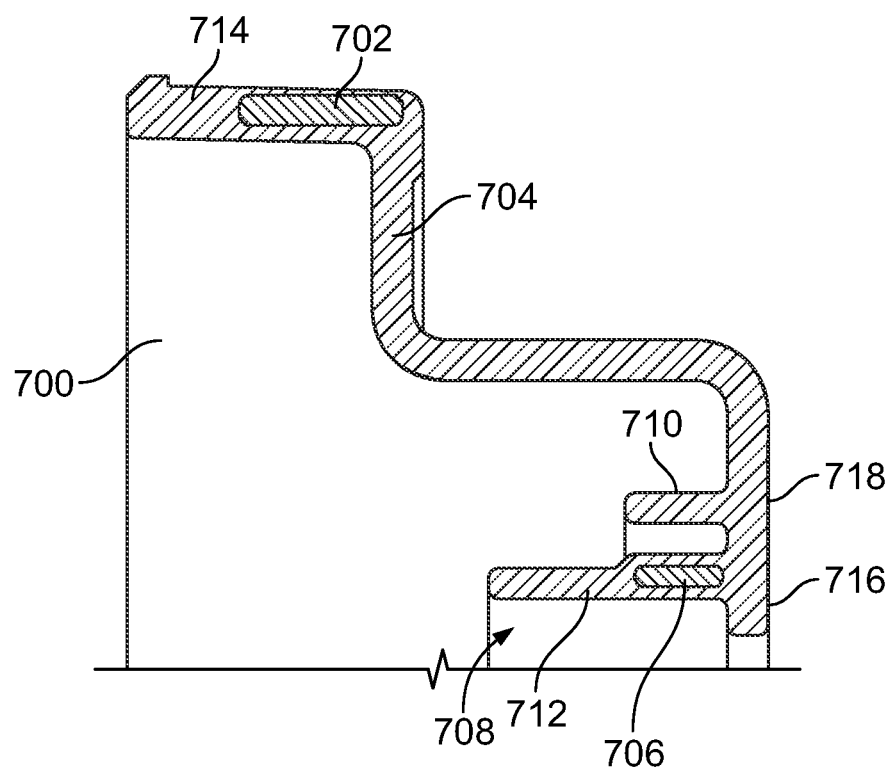
FIG. 12 is a cross-sectional view of a seal case having a tubular outer insert and a tubular inner insert.

With reference to FIG. 12, another seal case 700 is provided that includes an outer insert 702 made of a first material, a body 704 made of a second material, and an inner insert 706 made of a material that may be the same or different as the first material. The seal case 700 includes a first end section 714, a second end section 716, and a radial wall 718 of the second end section 716. The seal case 700 is similar in many respects to the seal case 600 discussed above. One difference between the seal cases 600, 700 is that the seal case 700 includes a labyrinth portion 708 having an outer labyrinth wall 710 and an inner labyrinth wall 712. The inner labyrinth wall 712 includes the inner insert 706. The inner insert 706 has a tubular configuration that extends in the inner labyrinth wall 712 and does not include flared tabs like the insert 606 discussed above. The inner insert 706 may be made of a material, such as steel, that expands and contracts less with changes in temperature than would a conventional plastic seal case. The inner insert 706 thereby resists changes to the inner and outer diameter of the inner labyrinth wall 712 and the second end section 716 due to changes in the temperature of the surrounding environment and preserves the geometry of the associated labyrinth seal.

Figure 13:
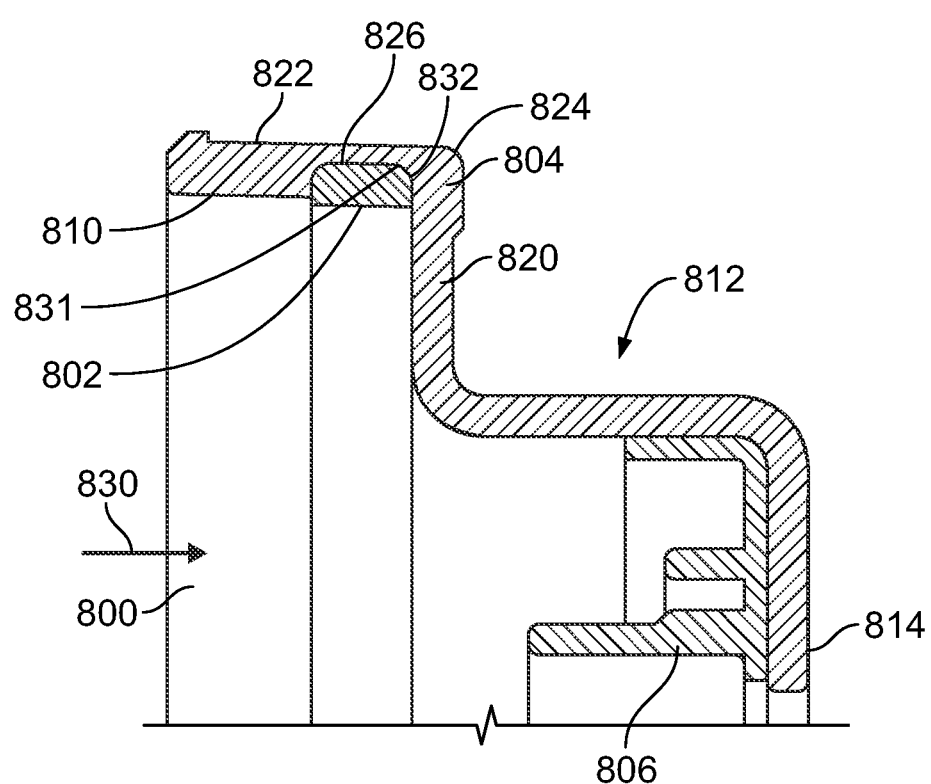
FIG. 13 is a cross-sectional view of a seal case having an insert that is inserted into the molded body of the seal case.

With reference to FIG. 13, another seal case 800 is provided that is similar in many respects to the seal case 70 discussed above. The seal case 800 includes an insert 802 made of a first material, a body 804 made of a second material, and a labyrinth stator 806 connected to the body 804. The seal case 800 includes a first end section 810, an intermediate section 812, and a second end section 814. The intermediate section 812 includes a radial wall 820 that connects to an axial wall 822 of the first end section 810 at a bend 824. The radial wall 820 and the axial wall 822 define a groove 826. To manufacture the seal case 800, the body 804 is molded and hardened in a first operation. Next, the insert 802 is pressed in direction 830 into the first end section 810. The insert 802 has a rounded, outer leading shoulder 831 that may cam the axial wall 822 slightly radially outward as the insert 802 is pressed into the body 804. The insert 802 snaps into the groove 826 once the insert 802 is radially aligned with the groove 826 to join the insert 802 to the second material of the body 804. The insert 802 increases the rigidity of the axial wall 822 and the radial wall 820 as well as resists temperature-driven changes to the outer diameter of the axial wall 822.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A method of making a seal case for a railway roller bearing assembly, the method comprising:
    bending a strip of a first material into an annular configuration;
    securing together portions of the strip of the first material in the annular configuration to form a ring;
    positioning the ring of the first material in a mold configured to form a seal case for a railway roller bearing assembly;
    advancing a second material into the mold;
    joining the second material to the ring;
    wherein the seal case has a central axis; and
    wherein positioning the ring of the first material in the mold includes positioning the ring in a first portion of the mold configured to form an annular, axially extending first end section of the seal case, the mold including an intermediate portion configured to form a radial wall of the seal case extending radially inward from the first end section.

2. The method of claim 1 wherein advancing the second material into the mold includes embedding the ring in the second material.

3. The method of claim 1 wherein bending the strip of first material into the annular configuration includes advancing the strip of the first material into a ring former and bending the strip of the first material using the ring former.

4. The method of claim 1 further comprising:
    advancing the strip of the first material from a coil; and
    separating the strip of the first material from a remaining portion of the coil.

5. The method of claim 1 further comprising:
    removing the seal case from the mold; and
    joining a labyrinth stator to the seal case.

6. The method of claim 5 wherein joining the labyrinth stator to the seal case includes press-fitting the labyrinth stator into the seal case.

7. The method of claim 1 wherein the mold has a second portion configured to form a second annular end section of the seal case;
    the method further comprising:
        removing the seal case from the mold; and
        joining a labyrinth stator to the second annular end section of the seal case.

8. The method of claim 1 wherein the mold has a second portion configured to form a second annular end section of the seal case.

9. The method of claim 8 wherein advancing the second material into the mold includes forming an annular intermediate section of the seal case that connects the first and second annular end sections, the annular intermediate section including the radial wall.

10. The method of claim 8 wherein advancing the second material into the mold includes advancing the second material into the first portion of the mold; and
    wherein joining the second material to the ring includes embedding the ring in the second material.

11. The method of claim 1 wherein advancing the second material into the mold comprises advancing the second material into the intermediate portion of the mold.

12. The method of claim 1 wherein the mold includes a second portion configured to form a second annular end section of the seal case; and wherein advancing the second material into the mold comprises advancing the second material into the second portion of the mold.

13. The method of claim 1 wherein the radial wall is perpendicular to the central axis.

14. A method of making a seal case for a railway roller bearing assembly, the method comprising:

bending a strip of a first material into an annular configuration;

securing together portions of the strip of the first material in the annular configuration to form a ring;

positioning the ring of the first material in a mold configured to form a seal case for a railway roller bearing assembly;

advancing a second material into the mold;

joining the second material to the ring;

wherein the seal case has a central axis and the mold includes a portion configured to form an annular end portion of the seal case, the annular end portion including a first radial wall, the method further comprising:

removing the seal case from the mold; and joining a labyrinth stator to the annular end portion of the seal case including positioning a second radial wall of the labyrinth stator adjacent the first radial wall of the annular end portion of the seal case, the labyrinth stator including at least one axial wall extending away from the second radial wall.

15. A method of making a seal case for a railway roller bearing assembly, the method comprising:

bending a strip of a first material into an annular configuration;

securing together portions of the strip of the first material in the annular configuration to form a ring;

positioning the ring of the first material in a mold configured to form a seal case for a railway roller bearing assembly;

advancing a second material into the mold;

joining the second material to the ring;

wherein the seal case has a central axis;

wherein positioning the ring of the first material in the mold includes positioning the ring in a first portion of the mold configured to form a first annular end section of the seal case, the first annular end section including an axial wall; and wherein advancing the second material into the mold includes advancing the second material into a second portion of the mold configured to form a second annular end section of the seal case, the second annular end section including a radial wall.

16. A method of making a seal case for a railway roller bearing assembly, the method comprising:

bending a strip of a first material into an annular configuration;

securing together portions of the strip of the first material in the annular configuration to form a ring;

positioning the ring of the first material in a mold configured to form a seal case for a railway roller bearing assembly;

advancing a second material into the mold;

joining the second material to the ring;

positioning a second ring in the mold, the second ring including a material different than the second material; and joining the second material to the second ring.

17. A method of making a seal case for a railway roller bearing, the method comprising:

positioning a metallic ring in a mold configured to form a seal case for a railway roller bearing assembly;

advancing a plastic material into the mold;

joining the plastic material and the metallic ring in the mold;

removing the seal case from the mold;

joining a labyrinth stator to the seal case;

wherein the seal case has a central axis; and wherein positioning the metallic ring in the mold includes positioning the metallic ring in a first portion of the mold configured to form an annular, axially extending first end section of the seal case, the mold including an intermediate portion configured to form a radial wall of the seal case extending radially inward from the first end section.

18. The method of claim 17 wherein joining the labyrinth stator to the seal case includes press-fitting the labyrinth stator into the seal case.

19. The method of claim 17 wherein joining the plastic material and the metallic ring includes embedding the metallic ring in the plastic material.

20. The method of claim 17 further comprising forming the metallic ring comprising:

bending a strip of metallic material using a ring former; and joining portions of the strip of metallic material to form the metallic ring.

21. The method of claim 17 wherein advancing the plastic material into the mold comprises advancing the plastic material into the intermediate portion of the mold.

22. The method of claim 21 wherein the mold includes a second portion configured to form an annular, second end section of the seal case; and wherein advancing the plastic material into the mold comprises advancing the plastic material into the second portion of the mold.

23. The method of claim 17 wherein the radial wall of the seal case extends perpendicular to the central axis.

24. A method of making a seal case for a railway roller bearing, the method comprising:

positioning a metallic ring in a mold configured to form a seal case for a railway roller bearing assembly;

advancing a plastic material into the mold;

joining the plastic material and the metallic ring in the mold;

removing the seal case from the mold;

joining a labyrinth stator to the seal case;

wherein the seal case has a central axis and the mold includes a portion configured to form an annular end portion of the seal case, the annular end portion including a first radial wall;

wherein joining the labyrinth stator to the seal case includes positioning a second radial wall of the labyrinth stator adjacent the first radial wall of the annular end portion of the seal case, the stator including at least one axial wall extending away from the second radial wall.

* * * * *